May 31, 1966  W. D. PAULAUSKAS  3,253,640
TIRE TOOL

Filed May 11, 1964  2 Sheets-Sheet 1

WITNESS
INVENTOR
William D. Paulauskas

May 31, 1966     W. D. PAULAUSKAS     3,253,640

TIRE TOOL

Filed May 11, 1964     2 Sheets-Sheet 2

WITNESS
Genevieve P. Lucas
Carmine V. Alfano

INVENTOR
William D. Paulauskas
August 24, 1965

United States Patent Office

3,253,640
Patented May 31, 1966

3,253,640
TIRE TOOL
William D. Paulauskas, 228 Clark Place, Elizabeth, N.J.
Filed May 11, 1964, Ser. No. 366,580
4 Claims. (Cl. 157—1.17)

The invention is a tire tool to be used for removing automobile tires from rims. The present tool is simple, strong, easily operated, and gives to the operator a low-cost device which can be employed in removing both tubeless and tube tires an an effective manner.

It will be understood that the best known and preferred embodiment of the invention is drawn and described herein but that changes and modifications may be made without departing from the invention or sacrificing any of its benefits.

The advantages of this invention will appear from the following description taken in connection with the accompanying drawing, wherein—

Figure 1:
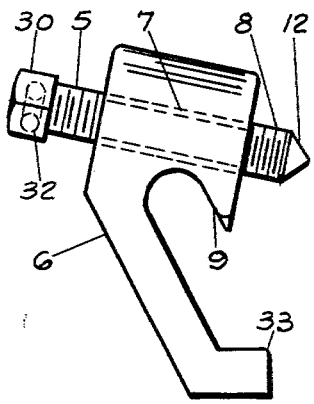
Figure 2:
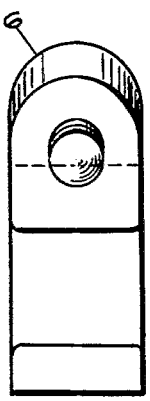
Figure 5:
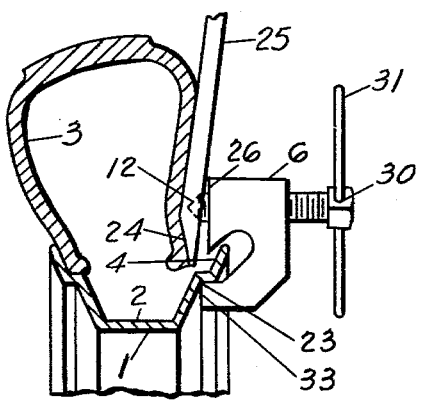
Figure 8:
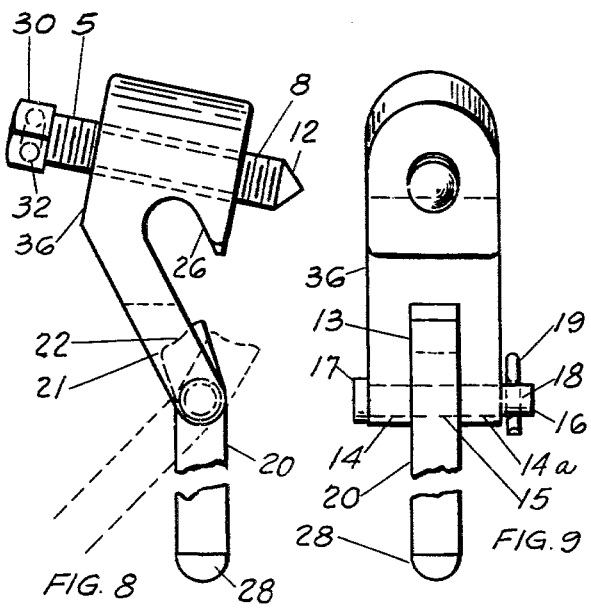
Figure 7:
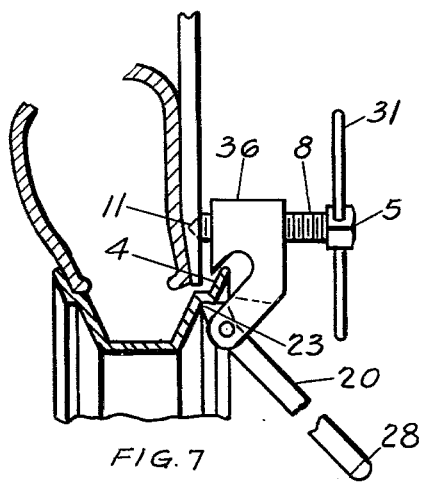
Figure 10:
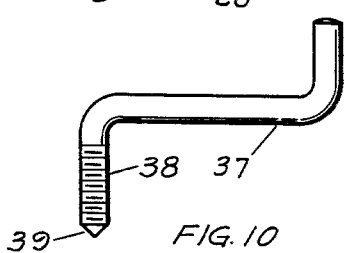
Figure 6:
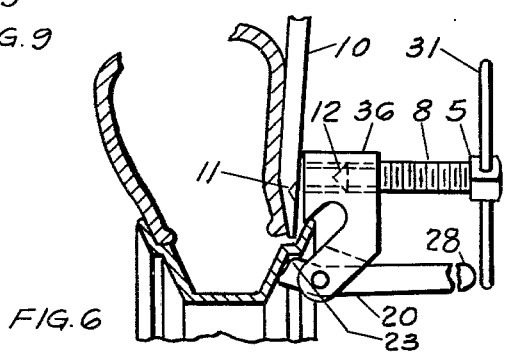
Figure 11:
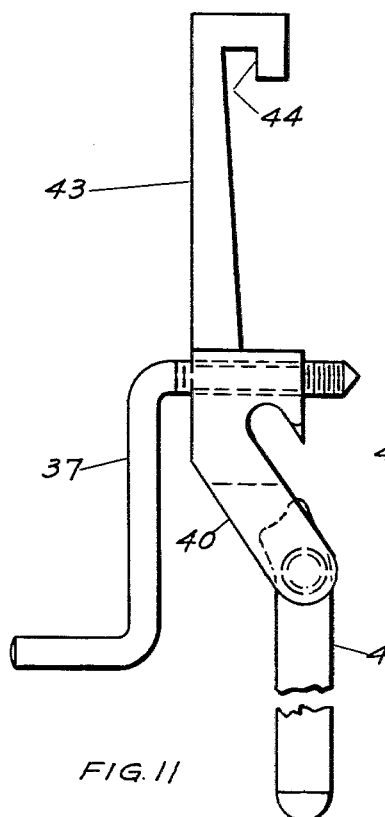
Figure 12:
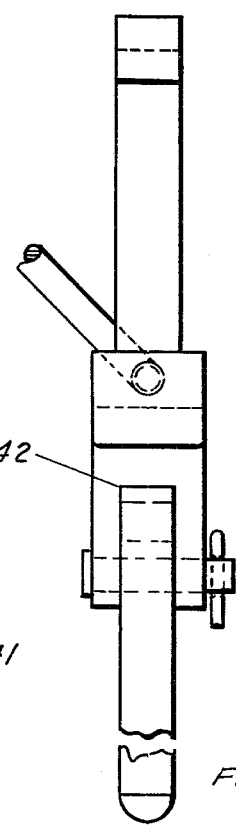
Figures 3, 4:
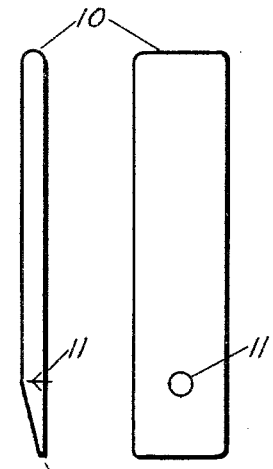
Figure 13:
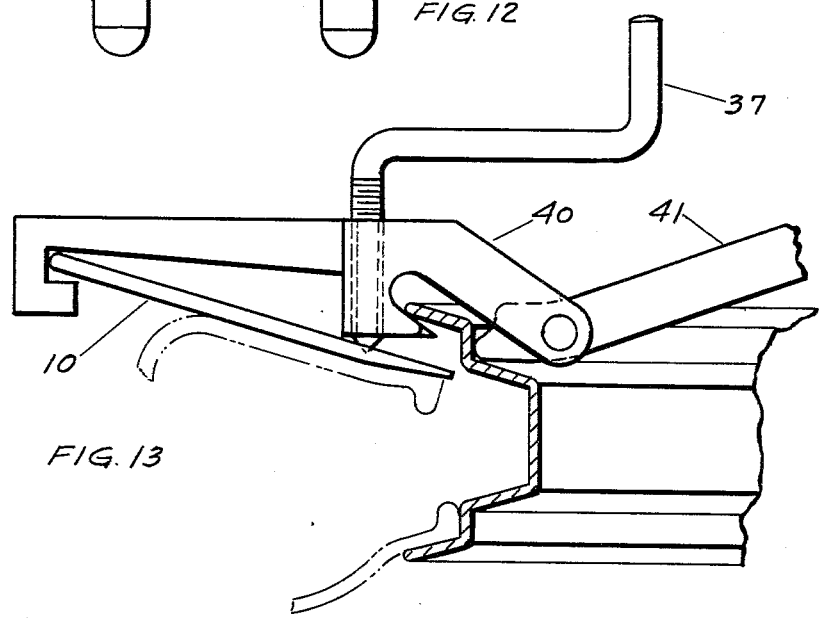

FIGURE 1 is the side view of my tire tool.
FIGURE 2 is a face or front view of the same.
FIGURE 3 is a body member tire protecting plate.
FIGURE 4 is side view of the same.
FIGURE 5 is view illustrating the application of the tool to the rim.
FIGURE 6 is view illustrating the application of the modified tool to the rim.
FIGURE 7 is view illustrating ultimate position of tool applied to the rim.
FIGURE 8 is side view illustrating a modification.
FIGURE 9 is face or front-end view of the same.
FIGURE 10 is a threaded crank.
FIGURE 11 is a side view of another modification.
FIGURE 12 is face or front-end view of the same.
FIGURE 13 is view illustrating ultimate position of tool applied to the rim.

The tire tool is indicated by numeral 6 in FIGURE 1 and is provided with threaded opening 7 to receive forcing screw 5. Lip portion is at 9. The said tire tool has its body member or tire protecting plate numbered 10 in FIGURES 3 and 4 having V-shaped hole or conical indentation at 11 to receive the V-shaped end or conical point of the screw at 12, FIGURE 1, which will cause the said tire protecting plate to interlock and thereby prevent the said tire protecting plate from sliding out during the tire removing operation.

FIGURE 8 shows modification of my tire tool having slot at 13, shown in FIGURE 9, and cylindrical opening at 14. A lever 20 having opening at 15 is pivotally mounted in the slot 13 through the opening in the tool at 14 and 14a and through the opening in lever 15 by pin 16. The said pin 16 having shoulder at 17 and drilled hole at 18 is held (locked) in its place by cotter pin 19. The said lever has a small radius at 21, FIGURE 8, and concave face at 22. This is to match the rim at 23, FIGURE 7, in order to have a positive lock. The lever 20 may be relatively square at 20 with sharp corners removed on the outer end at 28 or it may be round at 28.

The use of the tool is illustrated in FIGURES 5, 6, and 7, and the description is as follows: the wedge-like formed tire protecting plate end 29 FIGURE 4, is inserted first between the tire bead 24 and flange 4, FIGURE 5. This may be facilitated by hammering upon the end of the hand-grip portion of the unit if necessary. When the outer end of the tire protecting plate 25 is pressed and held down thereby creating empty space at 26, the said empty space permits the lip at 9 of tool 6 FIGURE 5 to be aligned with the tire protecting plate and to enter into operating position. The lip at 9 is shaped to match inner flange 4. The forcing screw 5 may be manipulated by any suitable wrench at the square portion 30 or it may be manipulated by pin 31. A drilled hole is provided at 32 to receive the said pin 31 and when the forcing screw 5 is turned clockwise the point of the screw at 12 enters the V-shaped hole at 11 and thereby holds the tire protecting plate from sliding out. The said tool 6 having lower portion 33 rests against the shoulder of the rim at 23 shown on FIGURE 5 and thereby is locked in a strongly operative position. Once applied it need not be further held by the operator. When the forcing screw 5 is turned further clockwise the tire protecting plate and the bead of the tire will be moved into the central depression of the rim. After the bead on one side of the tire has been once moved into the central depression of the rim, the tire is reversed and the bead on the other side is similarly shifted into the central depression (whereupon the bead at these locations may be shifted into the drop center and the casing at substantially the diametrically opposite locations can be moved off the rim).

The use of the modified tire tool 36 is illustrated in FIGURES 6 and 7. It will be understood that the same tire protecting plate may be used for this modified tire tool and in the same manner as described for the tool 6, FIGURE 1, and therefore in operating the tire tool 36, the tire protecting plate is inserted first between the tire bead 24 and flange 4 shown on FIGURE 6, and this may be facilitated by hammering upon the end of the hand-grip portion of the unit if necessary. The tool 36 is placed and aligned with the tire protecting plate by pushing clockwise downwardly on lever 20. The cam portion 22 is to engage the rim and tool is thereby clamped to the flange at 4 shown on FIGURE 7. In this action the lip 26, FIGURE 8 is drawn between flange 4 and tire protecting plate in operative position and once applied need not be further held by the operator. Further operations for modified tire tool 36 to be continued in the same manner as described for tool 6, FIGURE 1.

The embodiment of the tire tool 40 in FIGURES 11 and 12 of the drawing is essentially similar to that previously described and shown in FIGURES 8 and 9 and differs therefrom only in the means employed for engaging and retaining hand grip end of the tire protecting plate during the tire removing operation. Thus the lever 41 identical to lever 20 of the previously described embodiment of the invention is similarly mounted in slot 42 which is identical to slot 13 as shown in FIGURE 9. The use of the modified tire tool 40 is illustrated in FIGURE 13. It will be understood that the same tire protecting plate 10 may be used for this modified tire tool and in the same manner as previously described for the tool 6 in FIGURE 5 and for the tool 36 as shown in FIGURES 6 and 7.

Referring to the drawing there is shown a threaded crank previously referred to as FIGURE 10, with threaded portion numeral 38 terminating to a conical point 39, which may be used to some advantage in place of forcing screw 5 and in the same manner more clearly shown in FIGURES 11 and 13. Threaded portion 38 and conical point 39 are substantially indentical to forcing screw 5, threaded portion 8 and conical point 12 of FIGURE 1. In FIGURE 5 the rim is illustrated at numeral 1 inside rim 2, tire at 3. The rim has the usual side flange 4 upon which the bead of the tire rests.

I claim:

1. A tire removing tool consisting of block having a curved slot terminating in a lip matching the inside flange of the rim; the other end of said slot terminating in an L-shaped end adapted to rest behind the shoulder of the rim as a means of positively securing the block for tire removal operation; a threaded hole through said block perpendicular to the tire, a threaded forcing screw passing through said threaded opening, one end of said forcing screw having a wrench head and also receiving means for turning said forcing screw, the other end of forcing screw terminating in a cone-shaped pointed tip; a tire protecting plate having a hand grip end and a wedge end having a conical indentation adapted to receive said conical point of said forcing screw whereby when said plate is inserted between the tire and rim and said block is positioned on the rim, rotation of said screw will cause said plate to push the tire bead to the central rim depression.

2. A tire removing tool consisting of block having curved slot terminating in a lip matching inside flange of the rim; a threaded hole through upper portion of said block perpendicular to the tire; a threaded forcing screw passing through said threaded opening, one end of said forcing screw having a wrench head and also receiving means for turning said forcing screw, the other end of said forcing screw terminating in a cone-shaped pointed tip, said block having a second slot in the same plane as the forcing screw; a lever pivotally mounted in the said slot by means of a pin and having a hand grip at one end and having a cam on the other end adapted to securely engage the tire rim when lever is pivoted; a tire protecting plate having a hand grip on one end and the other end having a wedge shape and a conical indentation to receive said conical point of said forcing screw; the said screw engaging the said indentation as a means of preventing the slippage of said tire protecting plate while the said screw is being turned in order to push the bead of the tire to the central depression.

3. A tire tool as recited in claim 2 wherein said block is provided with a rearwardly extending arm terminating in a hook, the hook being engageable with said hand grip end of said tire protecting plate to retain said hand grip end of said tire protecting plate during the tire removal operation.

4. A tire tool as recited in claim 2, wherein the forcing screw is provided with a manually actuated crank arm.

References Cited by the Examiner
UNITED STATES PATENTS

| | | | |
|---|---|---|---|
| 1,519,558 | 12/1924 | Snider | 157—1.17 |
| 2,326,234 | 8/1943 | Leidel | 157—1.17 |
| 2,509,945 | 5/1950 | Strech et al. | 157—1.17 |
| 2,640,528 | 6/1953 | Caldwell | 157—1.17 |

GRANVILLE Y. CUSTER, JR., *Primary Examiner.*